UNITED STATES PATENT OFFICE.

CARLTON R. RADCLIFFE, OF NEW YORK, N. Y., ASSIGNOR, BY DIRECT AND MESNE ASSIGNMENTS, TO INTERNATIONAL PATENT CORPORATION, OF JERSEY CITY, NEW JERSEY, A CORPORATION OF SOUTH DAKOTA.

POWER-TRANSMISSION MECHANISM.

No. 864,258.     Specification of Letters Patent.     Patented Aug. 27, 1907.

Application filed June 24, 1905, Serial No. 266,767. Renewed July 18, 1907. Serial No. 384,413.

*To all whom it may concern:*

Be it known that I, CARLTON R. RADCLIFFE, a citizen of the United States, residing at city, county, and State of New York, have invented certain new and useful Improvements in Power-Transmission Mechanism, of which the following is a full, clear, and exact description.

My invention relates to power transmission apparatus, of a form particularly useful for automobiles.

The object is to combine in one structure the most advantageous features of the planetary gear and the so-called sliding gear.

The construction is such that, while in some respects it acts after the manner of the planetary gear, it differs in that on a direct drive the gears are positively locked against rotation, whereas in the usual planetary gear they are frictionally held. Furthermore, there is a neutral position where the driving member is out of engagement with the gears. The construction is also such that I do away with the clash of gears when the changes are being made from one speed to another in that part of the mechanism which suggests the sliding gear type. These and other benefits and advantages will be apparent to the mechanic skilled in this art from a study of the accompanying drawings and a reading of the following specification.

Figure 1:
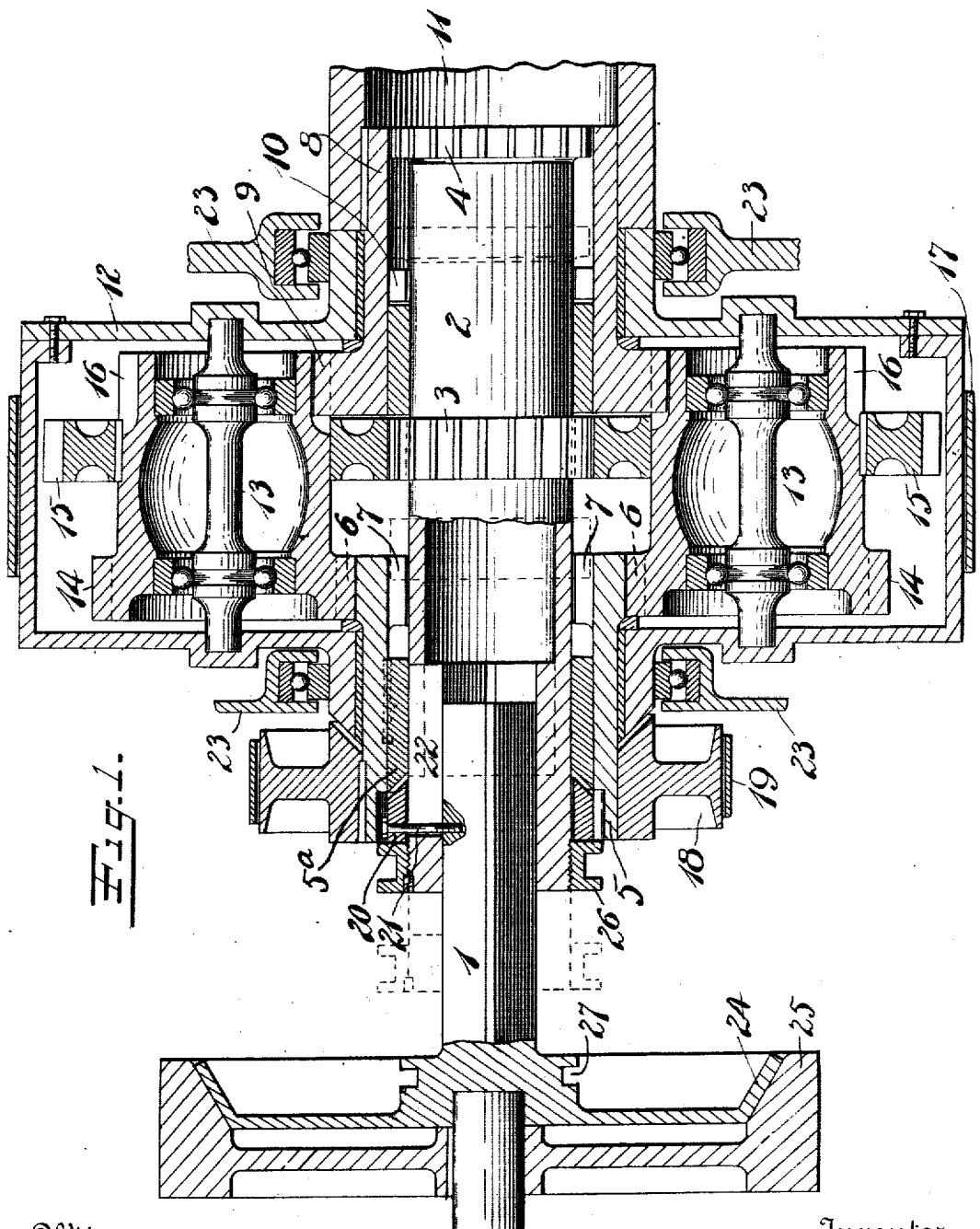
Figure 2:
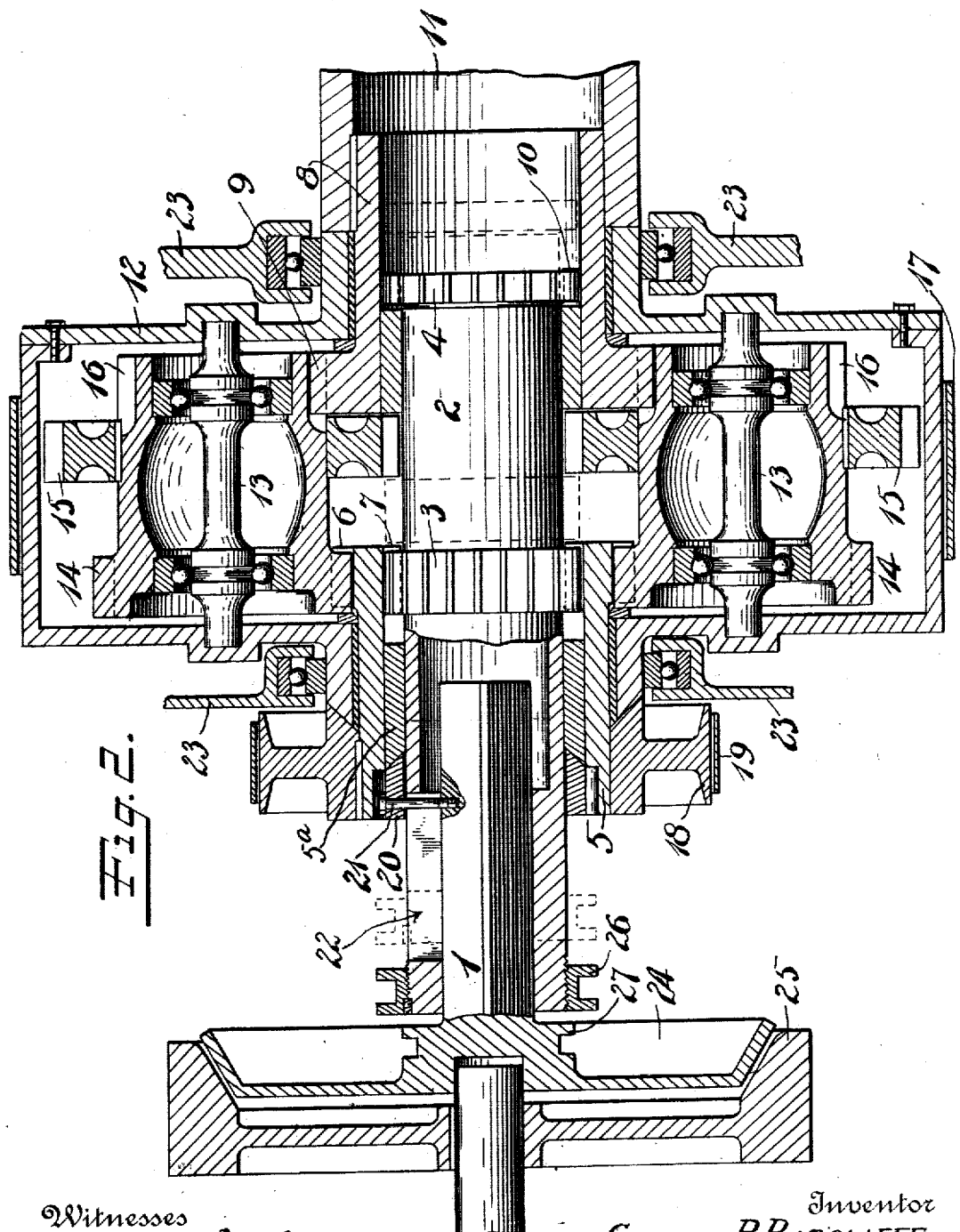
Figure 3:
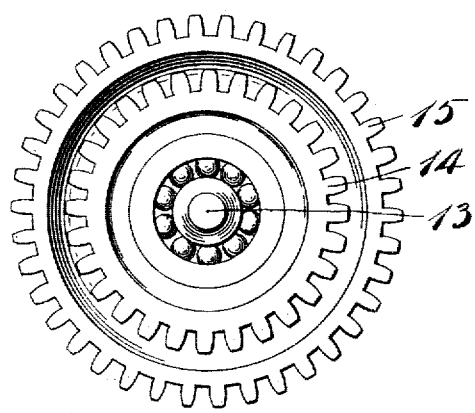
Figure 4:
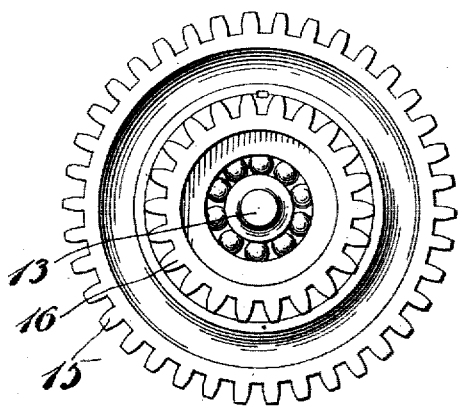
Figure 5:
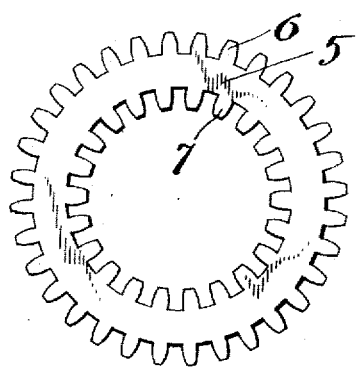
Figure 6:
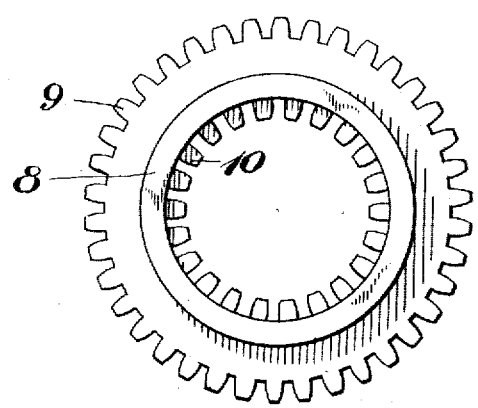

In the drawings Figure 1 is a longitudinal sectional view of the main parts of my transmission system, the parts being shown in position to transmit power at the lowest speed, which power may be transmitted either forwardly or reversely, according to which member is being held in check. Fig. 2 is a similar view, the parts being shown in position in which they appear when power is being transmitted directly from the driving to the driven member. Figs. 3, 4, 5 and 6 are detail views of various gears.

1 is the driving member. This driving member is squared and takes into a correspondingly shaped opening in an extension 2.

3 is the main driving gear fixed on extension 2. 4 is another gear fixed on the member 2 at one end thereof. The gears 3 and 4 are preferably of the same diameter. Revolubly mounted on one end of the member 2 is a sleeve 5. This sleeve 5 carries an external gear 6 and an internal gear 7. Revolubly mounted upon the other end of the member 2 is a sleeve 8 having an external gear 9 and an internal gear 10.

11 is the driven member keyed on sleeve 8.

12 is the gear case revoluble on sleeves 5 and 8.

13 is the arbor supporting the planetary gears. The planetary gears are 14, 15 and 16, these gears being of different diameters and dependently rotatable. Two sets of planetary gears are shown in the drawings. The gear 14 is always in mesh with gear 6. The gear 16 is always in mesh with gear 9. The gear 15 is at times in mesh with the gear 3, the latter being capable of being moved into and out of engagement with the same. The gear 3 is also arranged to engage at the proper time with the internal gear 7. The gear 4 is arranged to engage at such times as desired with the gear 10.

17 is a band-brake for case 12.

18 is a drum fixed upon sleeve 5.

19 is a band-brake for drum 18, which may be employed to arrest the rotation of the same. This band-brake 19 affords one means for arresting the rotation of the sleeve 5 (through drum 18) but other means may be employed equally well. The hub end of drum 18 may be tapered to face up with a corresponding taper upon the hub end of the case 12.

20 is a collar surrounding the member 2.

21 is a pin carried by the collar 20, passing through a longitudinal slot 22 in the wall of member 2, and secured in the driving member 1. One end of the collar 20 is tapered and arranged to face up with a corresponding taper upon the adjacent end of the sleeve 5, or the bushing 5ª which is keyed thereto. It follows that while the collar 20 must rotate with the member 2 and driving member 1, it may, however, be moved longitudinally on the former by the latter, and the length of the slot 22 through which the pin 21 passes is such that the member 2 may have a considerable independent sliding action.

23—23 are suitable external anti-friction supports for the case 12.

24 is a clutch on the driving member 1, arranged to properly engage with the fly wheel 25 of the motor, not shown.

26 and 27 are grooved collars on the members 2 and 24 respectively, to receive operating levers, (not shown.)

Operation: Referring to Fig. 1. The parts therein are in position so that the power of the driving part 1 will be transmitted to the driven member 11 at a relatively reduced speed. If the case 12 is held by band 17 the power will take the following course: through gear 3 to and through gear 15, thence through gears 16 and 9 to sleeve 8 and driven member 11. In this position it will be observed that the gear 4 is out of mesh with the gear 10. So also internal gear 7 is free. The speed secured by this arrangement is what I term the "first speed" ahead. To reverse the rotation of the driven member 11 relatively to driving member 1, it is merely necessary to release case 12 and hold in check the drum 18, sleeve 5 and gear 6, whereupon a differential action occurs, which will produce in the driven member 11 a reverse movement after the well-known manner. To secure the next higher, or intermediate speed ahead, the parts are shifted from the position shown in Fig. 1 in solid lines to that shown in dotted lines therein, in which the gear 3 is freed from gear 15, and its end is entered into the internal gear 7, which acts as a clutch. If the gear case 12 is now held against rotation, the power of the driving member 1 will be transmitted to the driven member 11 as follows: through gears 6, 14, 16 and 9 to sleeve 8 and driven member 11. In making the shift, it will be observed that the gear 3 passes through a free space or neutral position (see the dotted position of gear 3 in Fig. 2) where it will rotate idly without engaging anything. This is of great importance, because, when it is desired to have the driven part 11 run freely, the gear 3 may be held in said neutral position and the whole transmission mechanism will be disengaged from the member 2 and the driven part 11 will turn with freedom.

In the present day use of planetary gears, for example, as used on automobiles, it is with great difficulty that such vehicles can be moved by external power because of the internal friction of the planetary system. By my improvement this is avoided. In the passing of the gear 3 from the position shown in Fig. 1 through the neutral position and into the position shown in dotted lines, Fig. 1, the teeth of the gears 3 and 7 are brought readily into mesh without clashing, by reason of the fact that the planetary gears cease to revolve on the arbor 13, so that the casing will be caused to rotate at substantially the speed of the driven member 11, thus causing the internal gear 7 to move at practically the same speed as the approaching gear 3. This is brought about by reason of the retarding action of the drum 18, on gear case 12 and collar 20, on sleeve 5. The result is, gear 3 enters internal gear 7 readily and without clashing.

In shifting gears the clutch pedal (not shown) operating on collar 27 is pressed. The band brake 17 being free, permits the gear case 12 to revolve about the axis of gear 9. After withdrawing clutch 24 from the flywheel, the collar 20 comes into frictional contact with the sleeve 5ª which acts as a check to the motion of clutch 24, which of itself tends to lock the member 2 to drum 18. The continued movement of the collar 20 brings the hub of drum 18 into frictional engagement with the hub of gear case 12, thereby checking relative rotation of said parts and causing all gears to cease relative rotation, whereupon all parts will tend to assume the speed of gear 9, which latter is being driven by the momentum of the car, or other driven means. When gear 3 is moved longitudinally, so as to be disengaged from gear 15, the only means for causing part 2 to continue its rotation (aside from its own momentum) would be frictional contact between collar 20 and the sleeve 5ª fixed to drum 18. By slightly releasing the pressure on the clutch pedal, the clutch 24 would be permitted to move forward toward the fly-wheel. At the same time, collar 20 (pinned to square shaft 1) will also move forward out of engagement with the sleeve 5ª, whereupon clutch 24 (being still free of the fly-wheel 25) would then gradually cease to revolve, and the internal gear 7, then turning at the same speed as gear 9, will gradually increase its speed relative to gear 3, thus allowing said gears to be gently engaged.

For direct drive or high speed, the band 17 is released, freeing gear case 12. The clutch 24 is freed from the fly wheel 25. This freeing of clutch 24 causes the collar 20 through pin 21 to press against the bushing 5ª of sleeve 5, and move the latter slightly to the right, so as to bring the tapered hub end 18 against the hub of the case 12, holding the latter frictionally against independent rotation, whereupon all the parts tend to assume the same speed of rotation. The member 2 is then shifted from the position shown in dotted lines Fig. 1, to the position shown in solid lines, Fig. 2, whereupon the gear 4 will enter the gear clutch 10, locking all parts against independent rotation. The clutch 24 is then permitted to engage the fly wheel 25, whereupon the power thereof will be transmitted directly to the driven member 11 through the member 2, gear 4, internal gear 10 and sleeve 8.

I have referred to the parts 7 and 10 as internal gears. They are formed as such, but obviously their functions are merely those of positive clutches, with a multitude of holding points arranged to receive the teeth of the members 3 and 4.

Having thus described one preferred form of my invention, it will be seen that the gear 3 is the sun gear, while the gear 6 is in effect a secondary sun gear, operating as a driving gear only when the sun gear 3 is clutched therewith. The term "sun gear" as used in the claims, will therefore refer to gear 3 or its equivalent, while the term "secondary sun gear" will refer to the gear 6 or its equivalent. The tapered clutch members, to wit, in one instance the hub of the member 18, and in the other instance the tapered end of the collar 20, will be referred to in the claims as the synchronizing means, these means or equivalents being employed to synchronize the movement of the several gears while the gear 3 is traveling through the neutral space, so that it will enter either the clutch 7 or the gear 15 without undue clash or strain. So, also, this synchronizing means becomes useful in preventing clash between the gears 4 and 10. It will be understood, of course, that the presence of special synchronizing means is not essential to the broad idea of my invention, but its use is preferred.

What I claim is:

1. In a planetary gear system, a driving member, a driven member, a sun gear, a secondary sun gear, planetary gears arranged to mesh with both of said sun gears, and means of shifting one of said sun gears and bringing it into engagement with the other sun gear, and coöperating brake mechanism.

2. In a planetary gear system, a driving member, a driven member, a sun gear, a secondary sun gear, planetary gears arranged to mesh with both of said sun gears, mechanism coöperating therewith for effecting a drive through either of said sun gears at will.

3. In a planetary gear system, a driving member, a driven member, a sun gear, a secondary sun gear, planetary gears arranged to mesh with both of said sun gears, and means for shifting one of said sun gears out of direct engagement with its planetary gear, and coöperating brake mechanism.

4. In a planetary gear system, a driving member, a driven member, planetary gears, a sun gear carried by the driving member, a secondary sun gear carried thereby, means for disconnecting the sun gear from the planetary gears and clutching it with the secondary sun gear, and coöperating brake mechanism.

5. A planetary gear system including, a driving member, a driven member, planet gears and brake mechanism therefor, a gear on said driven member meshing with one of the planet gears, a sun gear on the driving member, a secondary sun gear revolubly mounted on said driving member and meshing with another of said planet gears, means for disengaging the first mentioned sun gear from the planet and clutching it with the secondary sun gear or freeing it from both of said gears, and means for holding said secondary sun gear against rotation when the sun gear is in engagement with its planet gear to impart a reverse motion to the driven member.

6. In a planetary gear system, a driving member, a driven member, a set of planetary gears coöperating therewith, a planetary gear case, a brake therefor, a sun gear, a secondary sun gear, said sun gears being of different diameters and arranged to mesh with planetary gears of appropriate diameters, another gear connected with the driven member and in mesh with one of the planetary gears, a clutch carried by the driving member and arranged to be positively engaged with the driven member at will.

7. In a power transmission system, a driving member, a driven member, a planetary gear system coöperating with said driving and driven members, in combination with a jaw clutch one member of which is carried by the driving member, the other member of which is carried by the driven member, said members being arranged to be engaged and disengaged.

8. In a planetary gear system for transmission purposes, a driving and a driven member, planet gears, a sun gear carried by the driving member and longitudinally movable thereon, and means for shifting the same into or out of driving engagement with the planet gears, and coöperating brake mechanism.

9. In a planetary gear system for transmission purposes, a driving and a driven member, planet gears comprising more than two gears, a plurality of sun gears one of which is longitudinally movable independently of the other, means coöperating therewith for moving said gear longitudinally into driving connection with one or the other of two planet gears of different diameters to impart one of two different speeds of rotation to the hub of the planet gears.

10. In a planetary gear system for transmission purposes, a driving and a driven member, planet gears coöperating therewith, a sun gear carried by the driving member coöperating with said planet gears, means for shifting said sun gear to connect or disconnect it from said planet gears at will, and coöperating brake mechanism.

11. In a planetary gear system for transmission purposes, a driving and a driven member, planet gears coöperating therewith, a gear case therefor, a sun gear carried by the driving member and coöperating with said planet gears, means for shifting said sun gear to connect or disconnect it from said planet gears at will, and an independent support for said planet gear case, and coöperating brake mechanism.

12. In a power transmission mechanism, a driving and a driven member, a set of planet gears co-operating therewith, a gear case therefor, driving means carried by the driving member and arranged to couple with the planet gears, and means coöperating therewith for transmitting to one of the gears of the planetary system either of two different speeds.

13. In a transmission mechanism, planet gears, a driving member, a sun gear thereon, a driven member, a sun gear thereon, means for shifting one of said sun gears from one planet gear into driving connection with another planet gear, and means for synchronizing the speed of the gears about to be meshed.

14. In a power transmission mechanism, a driving member, a driven member, gears carried thereby, said gears being of different diameters, planet gears, means for shifting one of the first mentioned gears longitudinally from engagement with one planet gear into driving connection with another planet gear, and means for synchronizing the speed of the two gears about to be meshed.

15. In a power transmission mechanism, a driving and a driven member, planet gears, gears carried by the driving and driven members arranged to mesh with the planet gears, means for shifting one of the latter gears into or out of driving engagement with the former for the purpose specified, and means for checking relative rotation of the gears about to be meshed during the act of shifting the same.

16. In a power transmission mechanism, a driving member, gears of different diameters carried thereby, planet gears of different diameters arranged to mesh therewith, a case or carrier for said planet gears, means for causing one or the other of the gears on the driving member to effect a driving connection with the planet gears or free the planet gears from driving connection with the gears on the driving member to permit said case or carrier to revolve freely.

17. In a power transmission mechanism, a driving member, gears of different diameters carried thereby, a driven member, planet gears of different diameters arranged to mesh with the first mentioned gears, means for shifting one of the gears on the driving member into or out of driving connection with two different planet gears, and means for checking or releasing the motion of said planet gear carrier.

18. In a power transmission mechanism of the planetary type, a driving member, a longitudinally movable extension rotatable therewith, a sun gear and a clutch member carried by said extension, a second sun gear concentric with the driving member and extension but of a different diameter than the sun gear thereon, a driven member having a clutch member, planet gears arranged to mesh with all said sun gears, one of said sun gears being movable to be freed from one of said planet gears and brought into driving connection with another of said planet gears and to permit the clutch member on said extension to be engaged with the clutch member on the driven part at will, and coöperating brake mechanism.

19. In a transmission mechanism, planet gears, a driving member, a sun gear thereon, a driven member, a sun gear thereon, all of said sun gears being arranged to mesh with said planet gears, means for shifting one of said sun gears on the driving member from driving connection with one of the planet gears into driving connection with another of said planet gears, and coöperating brake mechanism.

20. In a power transmission mechanism of the planetary type, a driving and a driven member, a sun gear on each of said parts, planet gears arranged to operatively connect said sun gears, a case or carrier therefor, said driving and driven members being provided with clutch elements, means for shifting one of said clutch elements longitudinally to move said clutch elements into or out of operative engagement, means to hold said planet gears against planetary movement, and means to hold the planet gear carrier against rotary movement independently of the driving member.

CARLTON R. RADCLIFFE.

Witnesses:
ROBT. S. ALLYN,
L. VREELAND.